United States Patent [19]
Farrell et al.

[11] Patent Number: 6,167,508
[45] Date of Patent: Dec. 26, 2000

[54] REGISTER SCOREBOARD LOGIC WITH REGISTER READ AVAILABILITY SIGNAL TO REDUCE INSTRUCTION ISSUE ARBITRATION LATENCY

[75] Inventors: James A. Farrell, Harvard, Mass.; Bruce A. Gieseke, San Jose, Calif.

[73] Assignee: Compaq Computer Corporation, Houston, Tex.

[21] Appl. No.: 09/088,818

[22] Filed: Jun. 2, 1998

[51] Int. Cl.[7] ................................................ G06F 9/38
[52] U.S. Cl. ........................ 712/217; 712/214; 712/216
[58] Field of Search .................................. 712/214, 216, 712/217

[56] References Cited

U.S. PATENT DOCUMENTS

| | | | |
|---|---|---|---|
| 5,488,730 | 1/1996 | Brown, III et al. | 712/41 |
| 5,790,827 | 8/1998 | Leung | 712/216 |
| 5,918,033 | 6/1999 | Heeb et al. | 712/217 |

OTHER PUBLICATIONS

Gieseke, Bruce A. et al., "A 600MHz Superscalar RISC Microprocessor With Out–Of–Order Execution", Paper presented at meeting dated Feb. 7, 1997.

Keller, Jim, "The 21264: A superscalar Alpha Processor with Out–of–Order Execution", Paper presented at the Microprocessor Forum on Oct. 22–23, 1996.

Gwennap, Linley, "Digital 21264 Sets New Standard", *Microprocessor Report*, vol. 10, Issue 14, (Oct. 28, 1996).

*Primary Examiner*—Kenneth S. Kim
*Attorney, Agent, or Firm*—Hamilton, Brook, Smith & Reynolds, P.C.

[57] ABSTRACT

Instruction issue logic is disclosed that assesses register availability. The issue logic comprises register scoreboard logic that includes destination register storage elements to identify destination registers of instructions queued for issue. An arbiter selects instructions for issue during a machine cycle from the queued instructions. Register-clean wires associated with each register are driven in response to the corresponding destination storage elements and the arbiter. These wires are used to identify the read-availability of registers. Specifically, such a logic system is capable of reflecting freed registers on the subsequent machine cycle so that previously issued instructions do not hinder queuing of new instructions, unless they require multiple cycles to complete. To increase speed of operation, single NMOS devices bridge the register-clean wires and the issue signal from the arbiter. Addition speed increase may be achieved by dividing the register scoreboard logic into odd and even register scoreboard arrays on either side of the arbiter.

22 Claims, 8 Drawing Sheets

REGISTER SCOREBOARD LOGIC WITH REGISTER READ AVAILABILITY SIGNAL TO REDUCE INSTRUCTION ISSUE ARBITRATION LATENCY

BACKGROUND OF THE INVENTION

Register scoreboard logic is commonly used in the instruction issue logic of central processing units (CPUs) that have the capability to issue instructions out-of-order. The scoreboard logic is used in instruction reorder buffers to assess register dependencies. For example, an instruction that updates a given destination register should not be issued before an instruction that uses the same register as a source register. In the typical implementation of scoreboarding logic, the older instructions in the instruction issue queue will prevent any newer, dependent instructions from issuing.

Instructions waiting in the queue are commonly represented as flat bit vectors in the scoreboard logic. Each bit represents a register of the CPU and is set, or not, based on whether the associated instruction utilizes the register. This enables issue logic to weigh the register resource requirements of each instruction to ultimately prioritize the instructions for issuance or passage to execution unit(s) of the CPU.

SUMMARY OF THE INVENTION

Especially in CPU architectures where multiple instructions may issue out-of-order during each machine cycle and where some of those instructions require multiple cycles to complete, register scoreboard logic is useful as a mechanism to clear instructions for issue and clear physical registers of the CPU for mapping to the virtual registers of instructions. The problem is updating the scoreboard logic to reflect issued instructions on a cycle-to-cycle basis. On one hand, it is desirable to issue an instruction one cycle and have its available register resources reflected in the logic on the next cycle, but on the other hand, scoreboard logic should not represent the critical path that limits machine cycle time, i.e., the logic must be fast enough.

In general, according to one aspect, the invention features instruction issue logic that assesses whether to issue instructions and register availability. The issue logic comprises register scoreboard logic that includes destination register storage elements to identify destination registers of instructions queued for issue. An arbiter selects instructions for issue during a machine cycle from the queued instructions. Register-clean wires associated with each register are driven in response to the corresponding destination storage elements and the arbiter. These wires are used to identify the read-availability of registers. Specifically, such a logic system is capable of reflecting freed registers on the subsequent machine cycle so that previously issued instructions do not hinder queuing of new instructions and any virtual to physical register mapping, unless the instructions require multiple cycles to complete.

In specific embodiments, gates are used to logically combine an issue signal from the arbiter with destination signals from the destination register storage elements for the queued instructions on precharged register-clean wires. To increase speed of operation, the gates comprise single NMOS devices bridging the register-clean wires and the issue signal from the arbiter. Additional speed increase may be achieved by dividing the register scoreboard logic into separate register scoreboard arrays, for example, on either side of the arbiter, such as arrays for the odd and even registers.

According to further specifics, source register storage elements are used to identify source registers for instructions queued for issue. Register-required wires are then driven in response to the source register storage elements and the register-clean wires to identify the ability of instructions to be issued.

In the described issue logic system, instructions requiring more than one machine cycle to generate a result are handled with multicycle logic. This logic overrides the read-availability of registers by controlling the corresponding register-clean wires based on the number of machine cycles required for issued instructions to complete.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings:

FIG. 7-1 and FIG. 7-2, is a circuit diagram showing the NMOS device used to drive the register-clean wires.

DETAILED DESCRIPTION OF THE INVENTION

Figure 1:
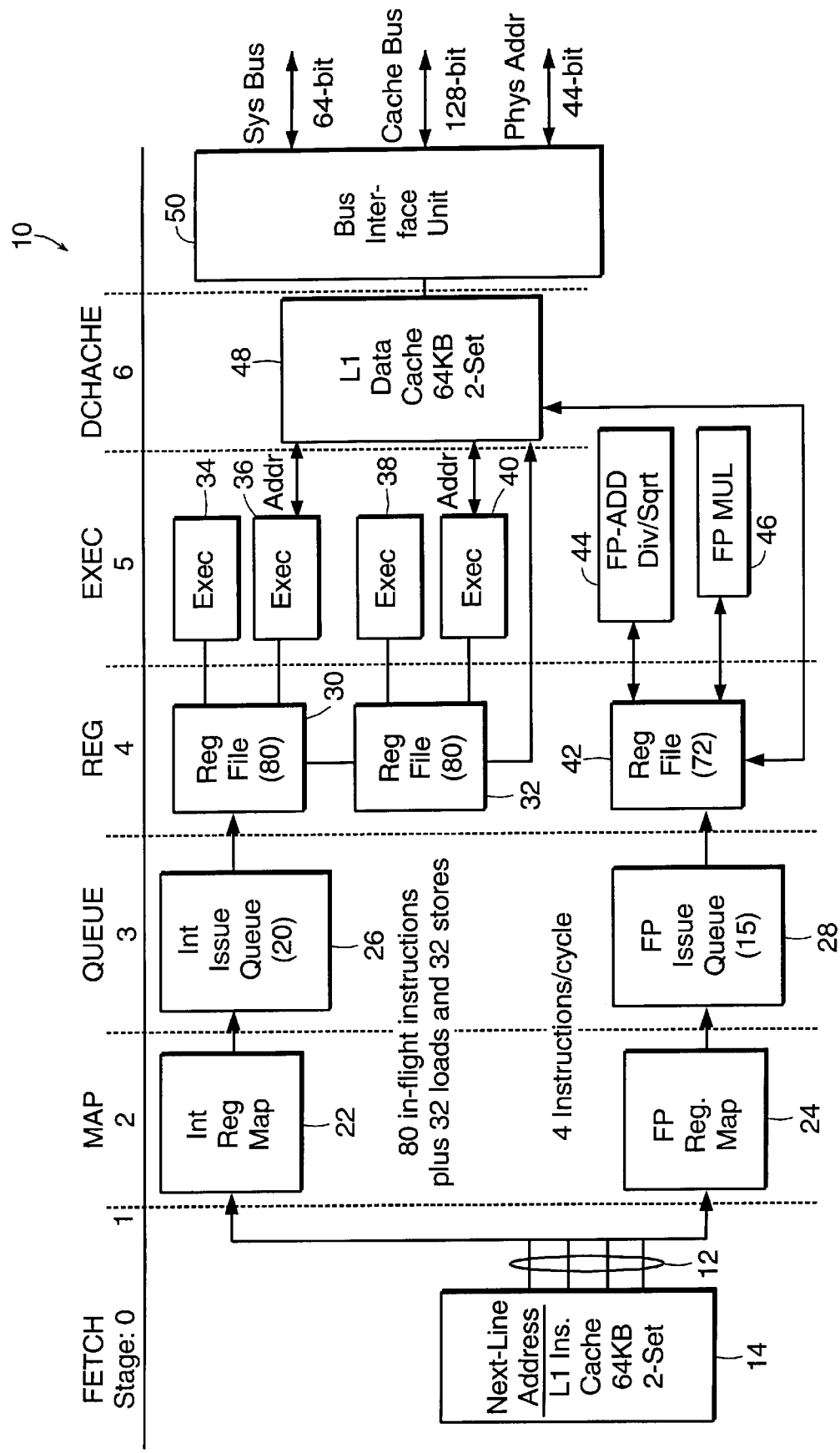
FIG. 1 is a block diagram illustrating the pipeline stages of a CPU to which the present invention is applied.

FIG. 1 is a block diagram illustrating the pipeline stages of a CPU 10 in which the present invention is implemented. Specifically, during fetch stages 0 and 1, four instructions 12 are fetched per machine cycle from the instruction cache 14.

Mapping pipeline stage 2 assigns the virtual registers identified in the fetched instruction to physical registers maintained in the CPU 10. In the preferred embodiment, four instructions are renamed per cycle, assigning up to 8 source and 4 destination registers. Further, there are 80 physical integer registers and 72 physical floating point registers. These mappings are performed in separate integer register mapper 22 and floating point register mapper 24.

Queue pipeline stage 3, containing the inventive instruction issue logic, issues instructions out-of-order when data is ready, i.e., when the registers containing the data are available. In the preferred embodiment, instructions leave the queues after they issue. There are 20 instruction entries in the integer issue queue 26 and 15 instruction entries in the floating point issue queue 28. Four integer instructions issue per cycle, and up to two floating point instructions issue per cycle.

In register pipeline stage 4, dual integer register files 30, 32 pass the data required by the issued instructions to four integer execution units 34–40. In a similar fashion, floating point register file 42 passes the required data for the floating point instructions to floating point divid/squareroot unit 44 and floating point multiply unit 46.

Two of the integer execution units 36, 40 have the capability to issue addresses to data cache 48, enabling two load/stores per cycle. The data cache 48 communicates off-chip via the bus interface 50.

Figure 2:
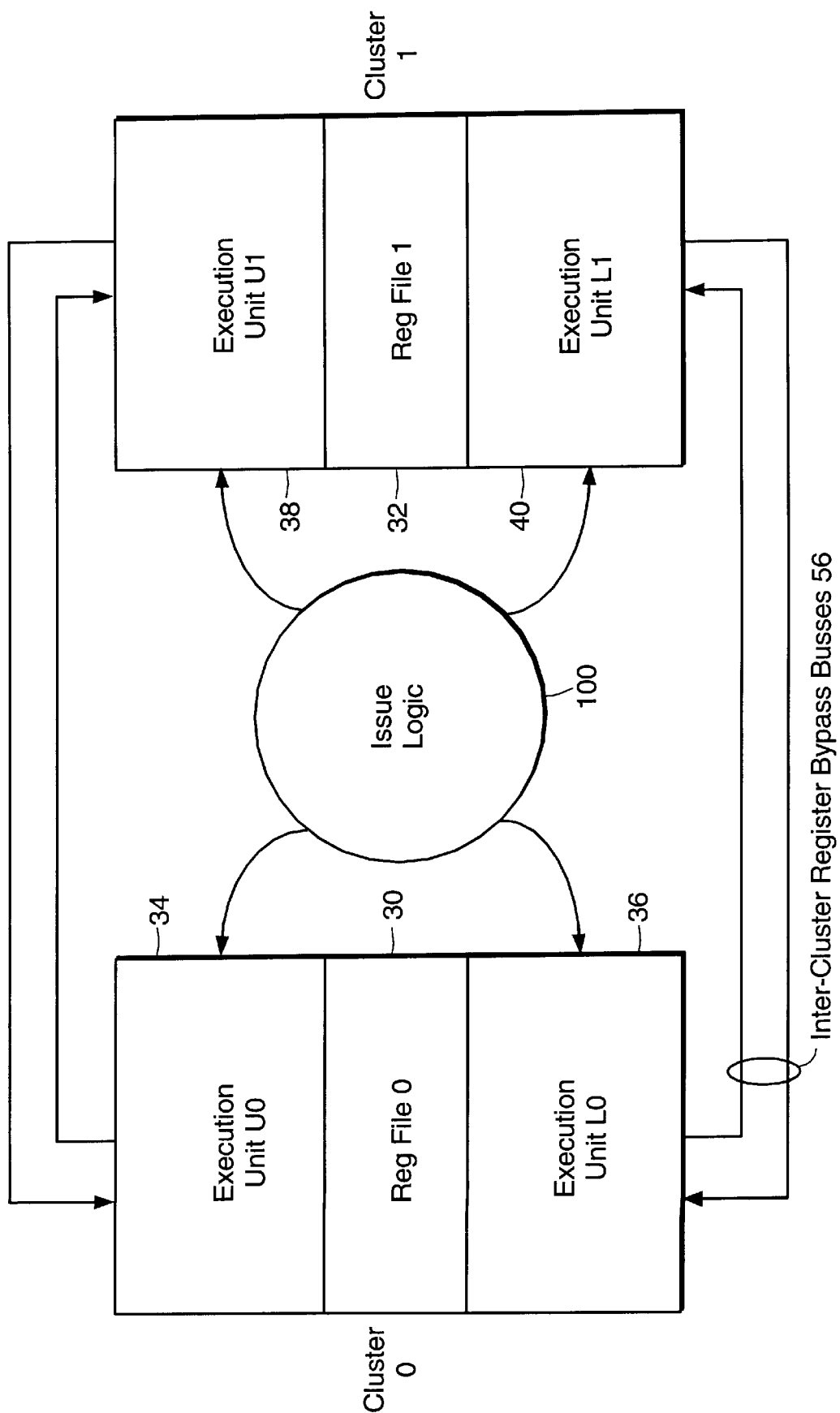
FIG. 2 is a block diagram showing the relationship between the issue logic, register files, and execution units of the CPU.

FIG. 2 shows the general layout for integer execution. Four integer execution units 34–40 are arranged in two clusters, cluster 0, cluster 1. Each cluster contains a complete copy of the register file: register file 0 30 and register file 1 32. The physical distance between the clusters requires that one cycle of latency exist between the conclusion of an operation in one cluster and the availability of the destination register in the other cluster. Register result data crosses between the clusters in intercluster register bypass buses 56.

The issue logic 100 schedules instructions to minimize the inter-cluster latency. The instructions are statistically assigned to request either the upper or lower pairs of execution units. This allows the instructions to have an opportunity to issue on the same cluster that produces the dependent register.

Figure 3:
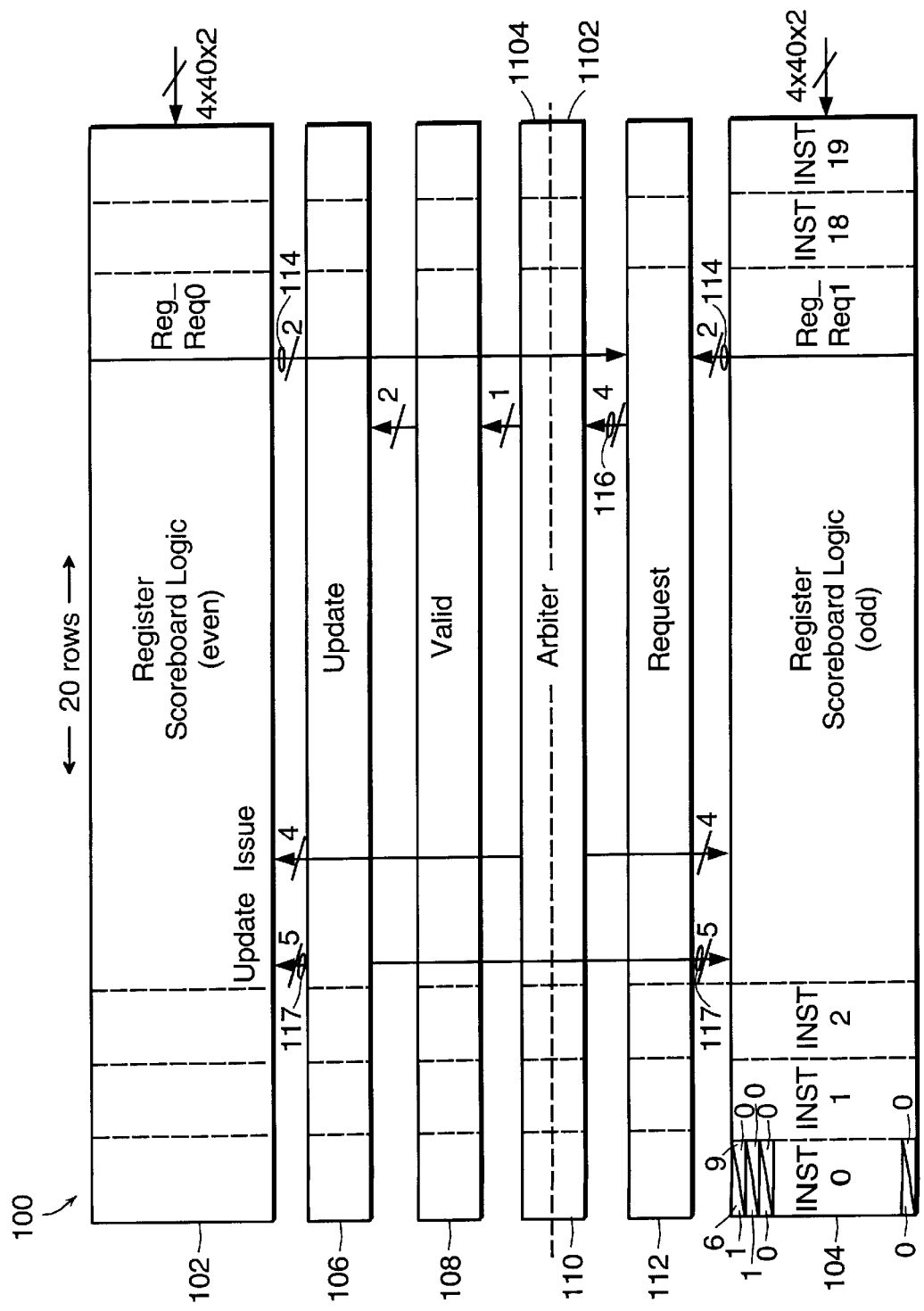
FIG. 3 is a block diagram describing the organization of the issue logic.

FIG. 3 shows the issue logic data path for the instruction queue. It contains 20 rows, one instruction occupying each row. The instructions are ordered from the oldest, INST0, at the bottom to the newest, INST19, in row 19, at the top. Up to four instructions enter the instruction queue per cycle, requiring compaction of the instructions remaining in the queue toward the bottom every cycle.

Register scoreboard logic is divided in halves 102, 104 book-ending the update 106, valid 108, arbiter 110, and request logic 112. Register scoreboard logic 102 holds the 40 even registers and register scoreboard logic 104 holds the 40 odd registers of the 80 total integer, physical registers, in the preferred embodiment.

For every instruction and each potential register required by the instructions, the register scoreboard logic holds two decoded fields (see fields a, b in register score board logic 104 at instruction INST0). The lower field is the decoded source register, and the upper field is the decoded destination register. Each cycle, the source field is compared to outstanding destination register numbers and a match signal is generated on one of two register request wires 114 running across the data path.

The request logic 112 stores execution unit assignment information. Each of the execution units 34–40 may execute different instructions or may or may not have access to the data cache 48. The request logic combines the execution assignment information with the two register request signals 114. The output is a four bit field 116 that indicates the execution units requested to the arbiter 110 by each row/instruction.

The arbiter 110 contains two pick-oldest-two arbiter circuits operating in parallel to choose up to four instructions each cycle for execution.

The valid logic 108 maintains a valid bit for each instruction and pulls one of the request lines when invalid. It calculates a new valid bit each cycle based on issue, invalidate, and reset information.

Finally, the update logic 106 accepts new valid bits each cycle and five select signals 117 used to compact the instructions in the queues 102, 104.

Figure 4:
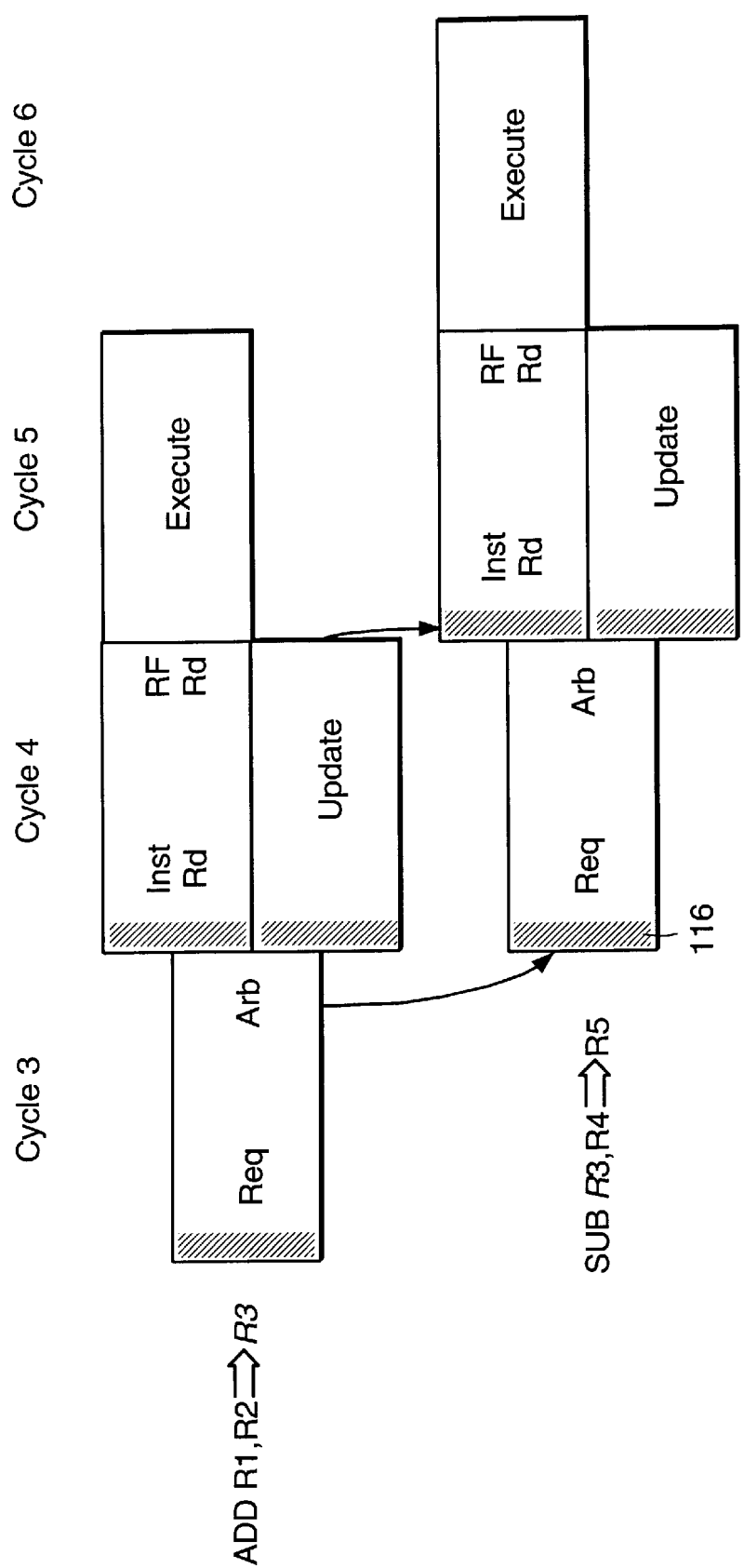
FIG. 4 is a timing diagram illustrating the register request, arbitration, scoreboard update, and instruction execution.

FIG. 4 is a timing diagram showing the progress of instructions from request to execution. In the illustrated example, ADD enters the queue, requests an execution unit, and wins the arbitration by the end of machine cycle 3, i.e., request and arbitration occur within one machine cycle. The issue signal is an index into the array with the instruction data enabling the instruction read in cycle 4. Passage of the instruction to the execution unit enables the register file read in the end of cycle 4 and the instruction execution in cycle 5.

According to the invention, the next issued instruction SUB can request to issue in cycle 4 since in the present invention, issuance of single cycle instructions makes available the corresponding registers for the next machine cycle. In this case, destination register R3 of ADD will be reflected as available in the scoreboard logic 102, 104 for the subsequent SUB, which uses R3 as the source register.

The issued instructions participate in the update calculation, which will overwrite that row in cycle 4 for the ADD and cycle 5 for the SUB, since in those cycles the corresponding instructions have exited the queue. This provides queue compaction at the beginning of each cycle as indicated by shaded region 116. The update logic calculates multiplexor select signal from valid state of the instructions in the queue and moves enough instructions to the bottom of the queue to free up to four rows at the top for newly fetched instructions.

Figure 5:
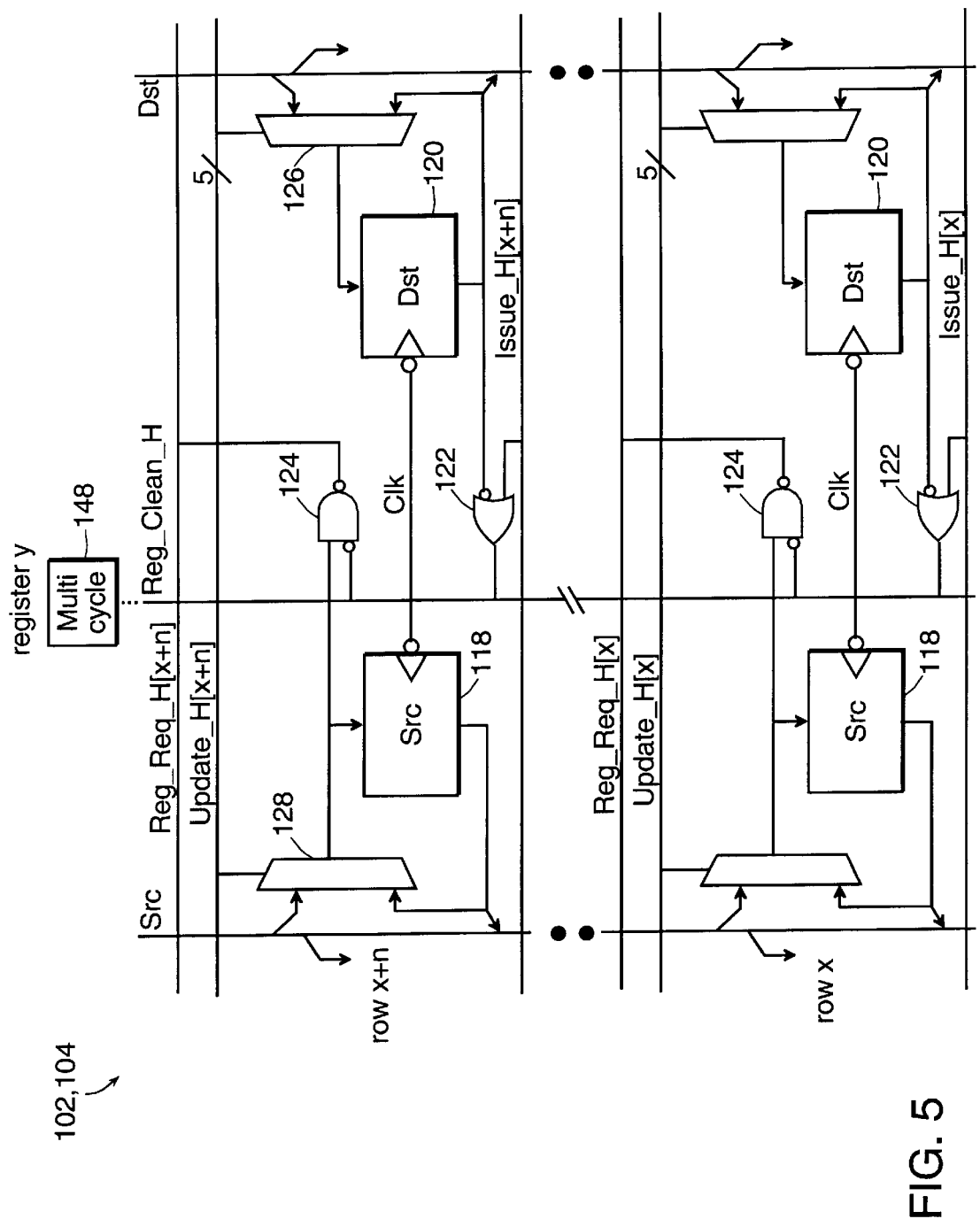
FIG. 5 is a circuit diagram of two rows of the scoreboard logic with the constituent source and destination storage elements.

FIG. 5 shows one column and two rows in the instruction scoreboard logic 102,104. Each row, row x, row x+n, corresponds to two instructions INST[x], INST[x+n]. For each register, register y, and each row x, x+n, there are two single bit storage elements to hold the decoded destination and source fields: source register latches 118 and destination register latches 120. The integer instruction mapper 22 described in connection with FIG. 1 ensures that the source and destination latches are never set together in the same row and that there is only one destination register latch 120 set in any column.

During each cycle, the Reg__Clean__H line is precharged and maintains a high logic state if the instruction requiring the register issued. If the register is unavailable, the Reg__Clean__H line is deasserted. This occurs when the Issue__H wire is low indicating that the instruction has not issued and destination register latch 120 is set, indicating the register is required as a destination register. This functionality is provided by gate 122, which bridges the latch and issue signals. Thus, if the instruction does not issue, then the register will not be available for dependent instructions in the following cycle. As a result, by looking over the 80 Reg__Clean__H wires, it can be quickly determined what registers are available.

Incoming source data in the source latches 118 is immediately compared to the vertical Reg__Clean__H wires, which indicate if the register is available for use by the instruction. If the register is unavailable, the register request wire, Reg__Req__H previously precharged is deasserted via gate 124.

Multiplexors 126, 128 allow movement of the instruction register data vertically through the scoreboard logic 102, 104. It is controlled by the update logic 106 via the 5 bits provided on the update lines Update__H.

In the preferred implementation, a multicycle instruction latch 148 is provided at the top of each Reg__Clean__H line.

This register is used to drive the Reg_Clean_H wire low when instructions have issued, which require multiple cycles to execute. Thus, for example, if an instruction issues that has a destination register corresponding to the illustrated Reg_Clean_H line, the multicycle latch 148 can be set to pull the line low for the number of cycles required for the instruction to complete execution and generate a result.

Figure 6:
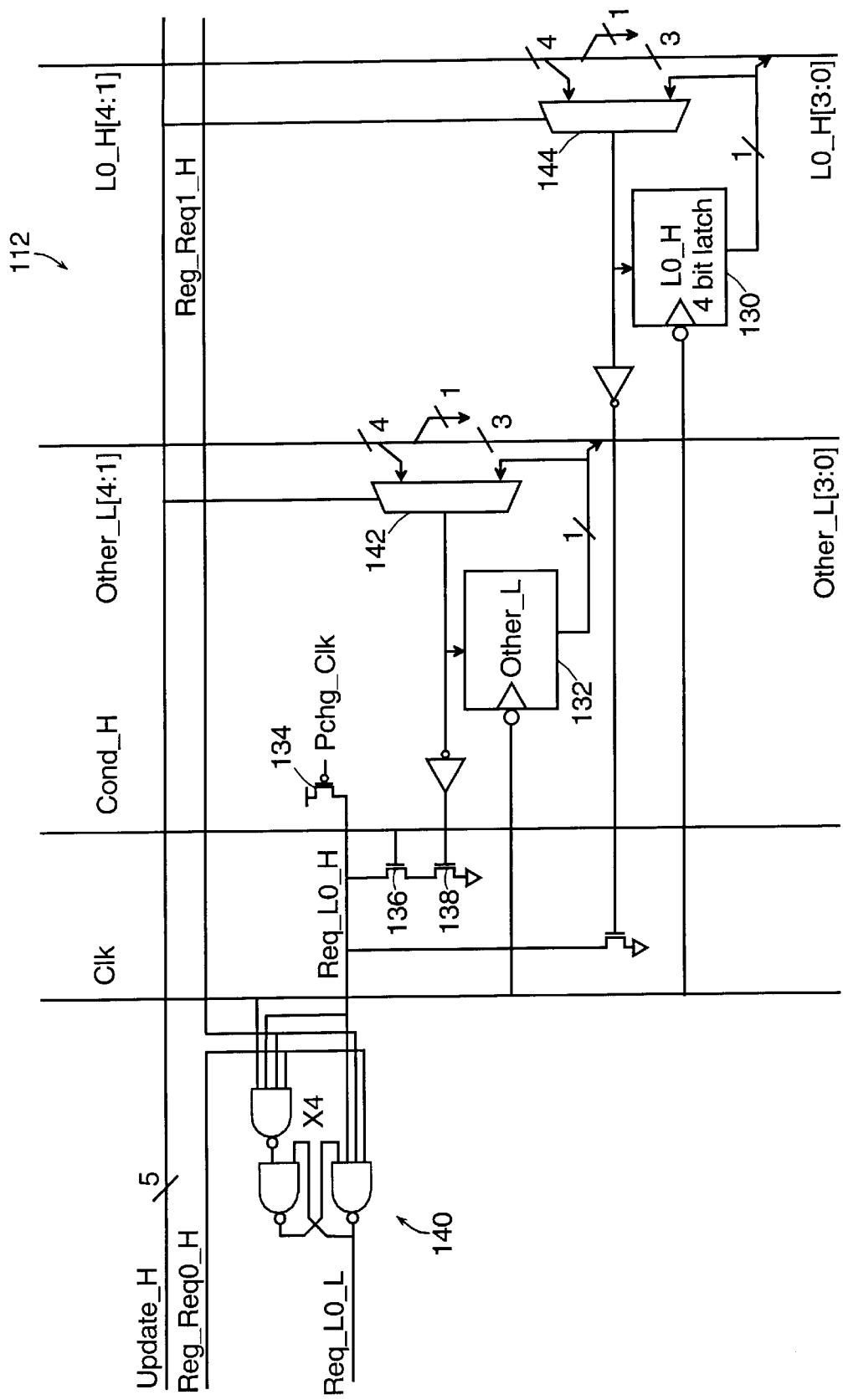
FIG. 6 is a circuit diagram showing register request logic of the issue logic.

FIG. 6 shows one row of the request logic 112. Specifically, there is a four bit latch 130, provided to hold decoded instruction data concerning execution assignment information. This information is logically combined with other instruction state information held in latch 132. For example, latch 132 can be set if the instruction requires an external bus for a data load operation, for example. The logic combination occurs in a precharged state provided by gate 134–138. Additional information can also be included in the logic combination via gate 136 carried on wire Cond_H. In the preferred embodiment, this line indicates whether the external bus is busy.

The result is passed to a combination of three logic gates 140. The gate output is latched as REQ_L0_L. There are a total of four lines, REQ_L0_L, REQ_L1_L, REQ_L2_L, REQ_L3_L, with corresponding gates 140, one for each execution unit 34–40. This carries the information concerning the appropriateness of the instruction for each of the four execution units 34–40.

Finally, as in the scoreboard logic, multiplexers 142 and 144 in the request logic 112 are controlled by the five Update_H lines from the update logic 106. This allows the movement of the instructions through the request logic 112 to reflect instruction issue.

Figures 1, 7:
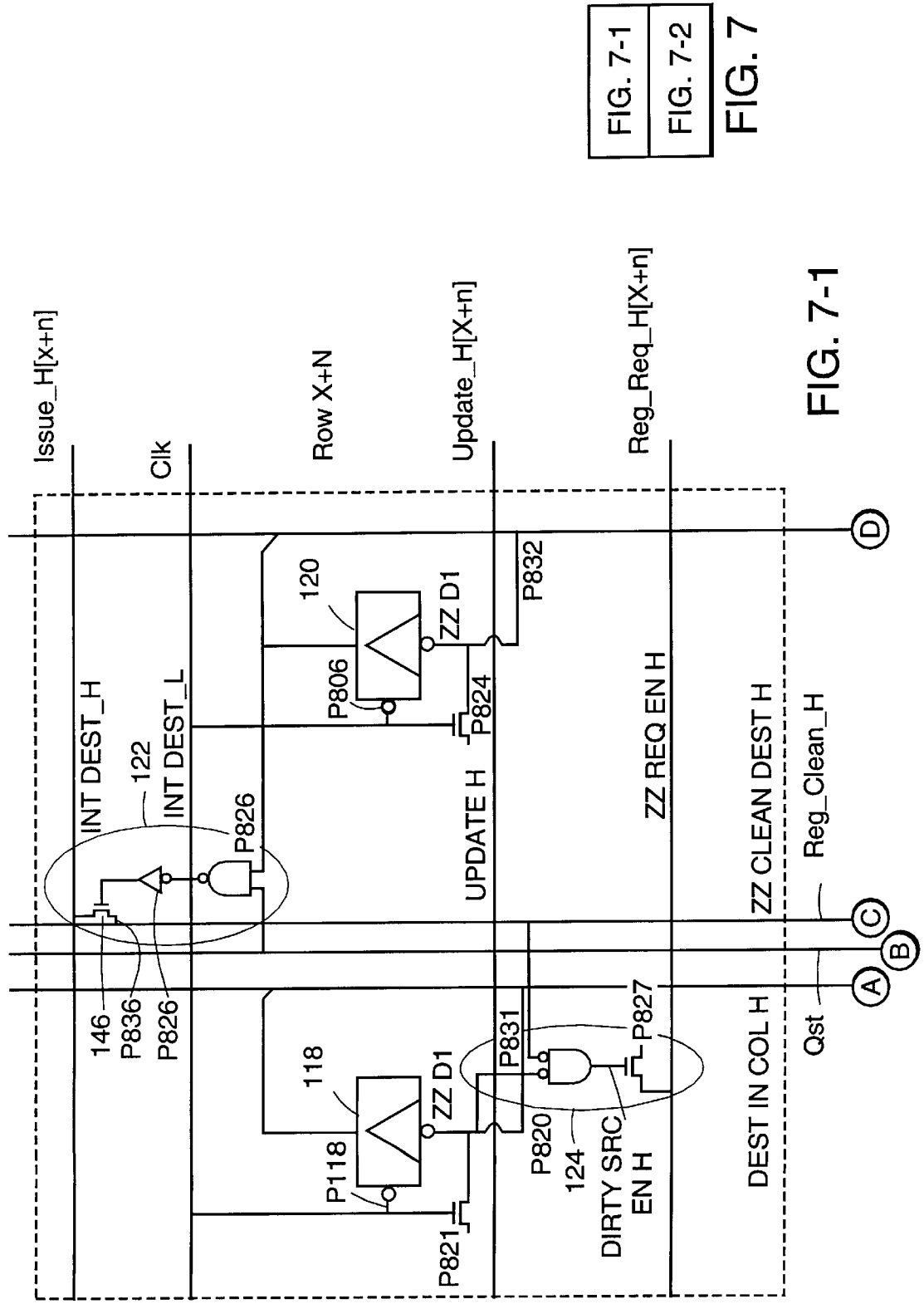
FIG. 7, comprising
Figures 2, 7:
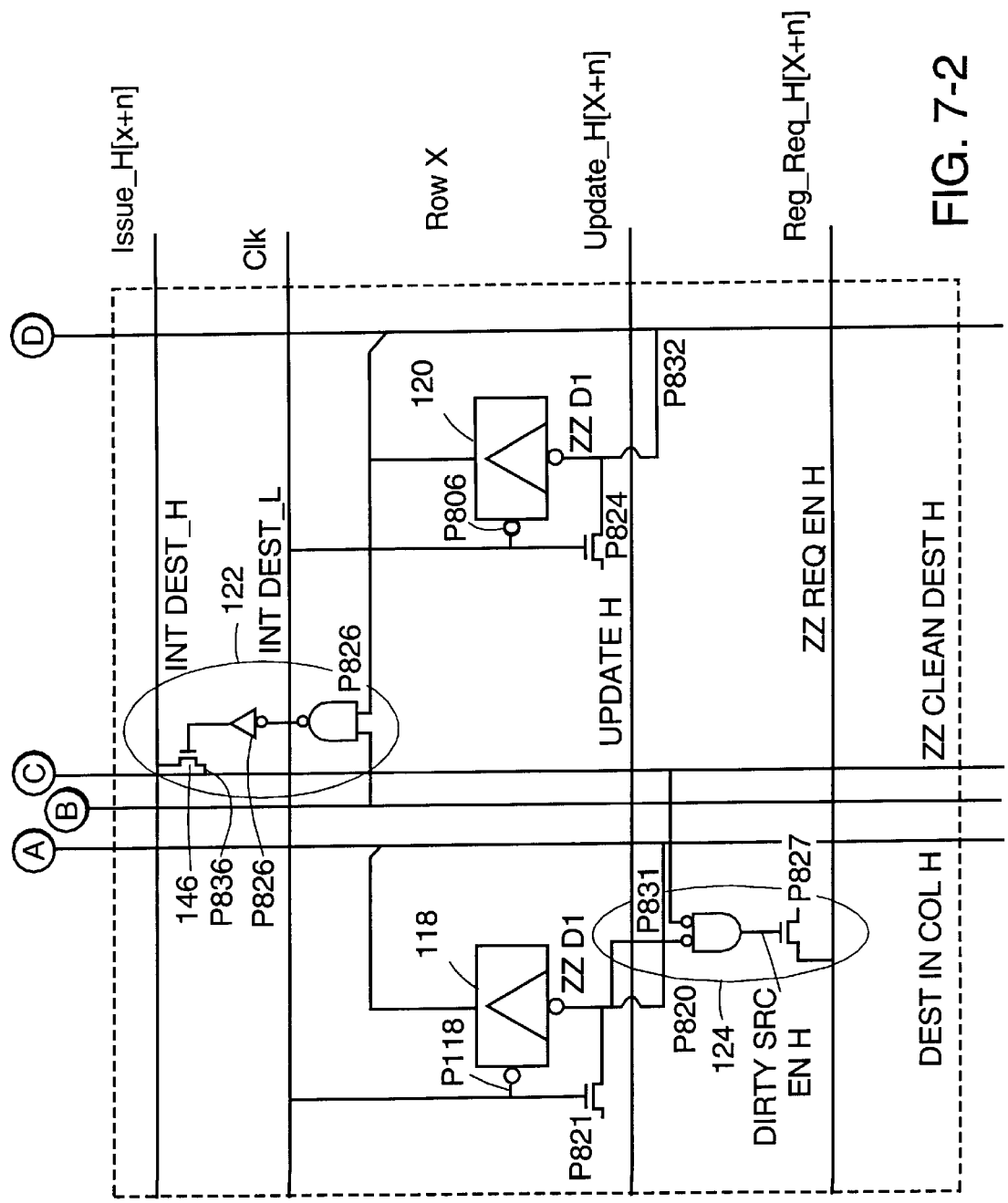

FIG. 7 is an actual circuit diagram showing the preferred implementation of the scoreboard logic of FIG. 5. The same reference numerals for the corresponding elements are used in each figure to correlate the drawings. As described previously, each cycle, the destination data held in the destination latches 120 is ANDed with the issue signal for that instruction on Issue_H. The register-clean wire, Reg_Clean_H, embodies the read-availability of the corresponding register. In the preferred embodiment, the ANDing function is performed by a single NMOS gate 146 that bridges the issue and register-clean wires, Issue_H and Reg_Clean_H. If the instruction does not issue, then the issue signal is driven low, which pulls the Reg_Clean_H signal low through the gate 146.

The use of a single gate, which increases the speed of the scoreboard logic, is possible because only one instruction with a particular physical destination is ever placed in the queue at a time, and each instruction can only have one destination. Thus, it is guaranteed that the issue signal will only have to pull down at most one Reg_Clean_H line and the rest of the load on the Issue_H line will be diffusion, which is considerably less load than driving into gates. The register-clean wire is broadcast across the entire height of the queue where it is compared with each instruction with a dependant source register.

By choosing the precharged value to be the same as not a register, most of the data in the queue does not draw power as it moves from one queue location to another. In addition, this array structure supports multiple requests.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. Instruction issue logic for assessing whether to issue instructions, the logic comprising:
   register scoreboard logic including destination register storage elements that identify destination registers of instructions queued for issue;
   an arbiter that selects instructions for issue during a machine cycle from the queued instructions; and
   register-clean wires associated with each register that indicate the read-availability of registers for a subsequent machine cycle in response to the arbiter and a state of the corresponding destination storage elements.

2. Instruction issue logic as described in claim 1, further comprising gates that logically combine an issue signal from the arbiter with destination signals for the queued instructions on the register-clean wires.

3. Instruction issue logic as described in claim 2, wherein the register-clean wires are precharged and then selectively driven low by the gates.

4. Instruction issue logic as described in claim 3, wherein the gates are single NMOS devices bridging the register-clean wires and the issue signal from the arbiter.

5. Instruction issue logic as described in claim 1, further comprising source register storage elements that identify source registers for instructions queued for issue.

6. Instruction issue logic as described in claim 1, further comprising register-required wires that identify the ability of instructions to be issued based on a state of the source register storage elements and the register-clean wires.

7. Instruction issue logic as described in claim 1, further comprising multicycle logic that overrides the read-availability of registers by controlling the corresponding register-clean wires based on issued instructions that require multiple machine cycles to complete.

8. Instruction issue logic as described in claim 1, further comprising update logic that compacts instructions queued in the register scoreboard logic after removal of instructions during each machine cycle.

9. Instruction issue logic as described in claim 1, further comprising execution unit selection logic for transmitting instruction unit assignment information to the arbiter.

10. Instruction issue logic as described in claim 1, wherein the register scoreboard logic is divided into multiple register scoreboard arrays on either side of the arbiter.

11. Instruction issue logic as described in claim 1, wherein the register scoreboard logic is divided into odd and even register scoreboard arrays on either side of the arbiter.

12. A method for issuing instructions and determining register availability, the method comprising:
    storing destination register information for instructions that are queued for issue in destination register storage elements of register scoreboard logic;
    selecting instructions for issue during a machine cycle from the queued instructions; and
    generating signals on register-clean wires associated with each register in response to a state of the corresponding destination storage elements and the arbiter to identify read-availability of registers for a subsequent machine cycle.

13. An instruction issue method as described in claim 12, further comprising logically combining an issue signal from the arbiter with destination signals for the queued instructions on the register-clean wires.

14. An instruction issue method as described in claim 13, further comprising precharging the register-clean wires and then selectively driving the register-clean wires low using the gates.

15. An instruction issue method as described in claim 14, further comprising driving the register-clean wires with single NMOS devices bridging the register-clean wires and the issue signal from the arbiter.

16. An instruction issue method as described in claim 12, further comprising storing source register information in source register storage elements for instructions queued for issue.

17. An instruction issue method as described in claim 12, further comprising driving register-required wires to identify the ability of instructions to be issued in response to a state of the source register storage elements and the register-clean wires.

18. An instruction issue method as described in claim 12, further comprising overriding the read-availability of registers by controlling the corresponding register-clean wires with multicycle logic when issued instructions require multiple machine cycles to complete.

19. An instruction issue method as described in claim 12, further comprising compacting instructions queued in the register scoreboard logic after removal of instructions during each machine cycle.

20. An instruction issue method as described in claim 12, further comprising selecting an execution unit for issued instructions in response to instruction unit assignment information transmitted to the arbiter.

21. An instruction issue method as described in claim 12, further comprising dividing the register scoreboard logic into multiple register scoreboard arrays on either side of an arbiter that selects instructions for issue.

22. An instruction issue method as described in claim 12, further comprising dividing the register scoreboard logic into odd and even register scoreboard arrays on either side of an arbiter that selects instructions for issue.

* * * * *